US011354713B2

(12) United States Patent
Grove

(10) Patent No.: US 11,354,713 B2
(45) Date of Patent: *Jun. 7, 2022

(54) METHOD AND SYSTEM TO GENERATE A PORTABLE CONTRACT DOCUMENT

(71) Applicant: eBay Inc., San Jose, CA (US)

(72) Inventor: Brian Alan Grove, San Jose, CA (US)

(73) Assignee: EBAY INC., San Jose, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 16/724,686

(22) Filed: Dec. 23, 2019

(65) Prior Publication Data

US 2020/0126132 A1 Apr. 23, 2020

Related U.S. Application Data

(63) Continuation of application No. 16/142,818, filed on Sep. 26, 2018, now Pat. No. 10,546,333, which is a continuation of application No. 14/832,689, filed on Aug. 21, 2015, now Pat. No. 10,108,994, which is a continuation of application No. 11/512,775, filed on Aug. 30, 2006, now abandoned.

(51) Int. Cl.
*G06Q 30/00* (2012.01)
*G06Q 30/06* (2012.01)

(52) U.S. Cl.
CPC ......... *G06Q 30/06* (2013.01); *G06Q 30/0601* (2013.01); *G06Q 30/0609* (2013.01); *G06Q 30/0641* (2013.01)

(58) Field of Classification Search
CPC ............... G06Q 30/06; G06Q 30/0601; G06Q 30/0609; G06Q 30/0641

USPC ....................................................... 705/26, 27
See application file for complete search history.

(56) References Cited

U.S. PATENT DOCUMENTS

| | | | |
|---|---|---|---|
| 5,692,206 A | 11/1997 | Shirley et al. |
| 5,794,207 A | 8/1998 | Walker et al. |
| 6,041,310 A | 3/2000 | Green et al. |
| 6,067,531 A | 5/2000 | Hoyt et al. |
| 7,162,428 B1 | 1/2007 | Rosenthal et al. |
| 8,121,946 B1 | 2/2012 | Arguello et al. |
| 10,108,994 B2 | 10/2018 | Grove |
| 10,546,333 B2 | 1/2020 | Grove |
| 2001/0044769 A1 | 11/2001 | Chaves |
| 2002/0046081 A1 | 4/2002 | Albazz et al. |
| 2002/0065707 A1 | 5/2002 | Lancaster et al. |
| 2002/0120554 A1 | 8/2002 | Vega |
| 2003/0216995 A1 | 11/2003 | Depauw et al. |
| 2004/0225582 A1 | 11/2004 | Spitzer |

(Continued)

OTHER PUBLICATIONS

U.S. Appl. No. 11/512,755, filed Aug. 30, 2006, Abandoned.

(Continued)

*Primary Examiner* — Robert M Pond
(74) *Attorney, Agent, or Firm* — Schwegman Lundberg & Woessner, P.A.

(57) ABSTRACT

A method and system to generate a portable contract document are provided. The method includes receiving contract information from a client device via an interactive electronic document having one more visual controls. The contract information comprises sale item information, buyer information, and sale price information. The method further includes generating a contract document for a sale of the sale item, utilizing the contract information, and communicating the contract document to the client device via a network communication.

18 Claims, 7 Drawing Sheets

(56) References Cited

U.S. PATENT DOCUMENTS

| | | | |
|---|---|---|---|
| 2005/0027646 | A1 | 2/2005 | Hall et al. |
| 2006/0059087 | A1 | 3/2006 | Smith et al. |
| 2006/0100894 | A1 | 5/2006 | Weiner et al. |
| 2008/0059322 | A1 | 3/2008 | Grove |
| 2015/0363845 | A1 | 12/2015 | Grove |
| 2019/0026799 | A1 | 1/2019 | Grove |

OTHER PUBLICATIONS

Non-Final Office Action received for U.S. Appl. No. 16/142,818, dated Apr. 30, 2019, 16 pages.
Response to Non-Final Office Action filed on Jul. 19, 2019 for U.S. Appl. No. 16/142,818, dated Apr. 30, 2019, 8 pages.
Response to Non-Final Office Action filed on Feb. 6, 2019, for U.S. Appl. No. 16/142,818 , dated Nov. 14, 2018, 6 pages.
Notice Of Allowance received for U.S. Appl. No. 16/142,818, dated Sep. 17, 2019, 7 pages.
Non-Final Office Action received for U.S. Appl. No. 16/142,818, dated Nov. 14, 2018, 9 pages.
Appeal Brief filed for U.S. Appl. No. 11/512,775, mailed on May 30, 2012, 18 pages.
Response to Non-Final Office Action filed on Sep. 16, 2016, for U.S. Appl. No. 14/832,689, dated Jun. 16, 2016, 9 pages.
Appeal Decision received for U.S. Appl. No. 11/512,775, mailed on Jun. 25, 2015, 6 pages.
Decision on Pre-Appeal Brief Request for U.S. Appl. No. 11/512,775, mailed on Apr. 30, 2012, 2 pages.
Examiner's Answer to Appeal Brief for U.S. Appl. No. 11/512,775, mailed Aug. 30, 2012, 15 pages.
Final Office Action received for U.S. Appl. No. 11/512,775, dated Jan. 7, 2011, 9 pages.
Final Office Action received for U.S. Appl. No. 11/512,775, dated Oct. 21, 2011, 10 pages.
Non-Final Office Action received for U.S. Appl. No. 11/512,775, dated Apr. 18, 2011, 10 pages.
Non-Final Office Action received for U.S. Appl. No. 11/512,775, dated May 25, 2010, 10 pages.
Pre-Appeal Brief Request filed for U.S. Appl. No. 11/512,775, filed Mar. 21, 2012, 5 pages.
Reply Brief filed on Oct. 30, 2012, for U.S. Appl. No. 11/512,775, in response to Examiner's Answer to Appeal Brief mailed on Aug. 30, 2012, 7 pages.
Response to Final Office Action filed on Mar. 7, 2011, for U.S. Appl. No. 11/512,775, dated Jan. 7, 2011, 10 pages.
Response to Non-Final Office Action filed on Jul. 18, 2011, for U.S. Appl. No. 11/512,775, dated Apr. 18, 2011, 10 pages.
Response to Non-Final Office Action filed on Oct. 25, 2010, for U.S. Patent Application No. 11/512,775, dated May 25, 2010, 8 pages.
Notice of Allowance received for U.S. Appl. No. 14/832,689, dated Jun. 12, 2018, 11 pages.
Final Office Action received for U.S. Appl. No. 14/832,689, dated Dec. 22, 2016, 28 pages.
Final Office Action received for U.S. Appl. No. 14/832,689, dated Feb. 28, 2018, 24 pages.
Non-Final Office Action received for U.S. Appl. No. 14/832,689, dated Jul. 26, 2017, 23 pages.
Non-Final Office Action received for U.S. Appl. No. 14/832,689, dated Jun. 16, 2016, 20 pages.
Kisiel, "Survey: Many shop online, most don't seek quotes", Automotive News 80.6215: 24. Crain Communications, Aug. 7, 2006, 9 pages.
Preliminary Amendment received for U.S. Appl. No. 14/832,689, filed Oct. 2, 2015, 6 pages.
Response to Final Office Action filed on Apr. 24, 2017, for U.S. Appl. No. 14/832,689, dated Dec. 22, 2016, 11 pages.
Response to Final Office Action filed on May 18, 2018, for U.S. Appl. No. 14/832,689, dated Feb. 28, 2018, 10 pages.
Response to Non-Final Office Action filed on Dec. 28, 2017, for U.S. Appl. No. 14/832,689, dated Jul. 26, 2017, 10 pages.

400

| | |
|---|---|
| SALE ITEM TITLE/DESCRIPTION | _____ 402 |

AUTO ○ 404

MAKE [____ 406] YEAR [____ 408]

ADDITIONAL INFORMATION [____] PRICE [____ 412]
410

SELLER INFORMATION [____] 414

BUYER INFORMATION [____] 416

ADDITIONAL SERVICES

INSURANCE PROTECTION ☐ 418  DETAILS [____] 422

ROAD ASSISTANCE ☐ 420  DETAILS [____] 424

VERIFICATION INFORMATION — 426

FUNDING VERIFICATION ☐ 428  [____] 430

FINANCIAL SERVICE/INSTITUTION [____]

SELLER VERIFICATION ☐ 432

TITLE VERIFICATION ☐ 434

[NEXT] 436  [CANCEL] 438

FIGURE 4

METHOD AND SYSTEM TO GENERATE A PORTABLE CONTRACT DOCUMENT

CLAIM OF PRIORITY

This application is a continuation of U.S. application Ser. No. 16/142,818, filed Sep. 26, 2018, which is a continuation of U.S. application Ser. No. 14/832,689, which is a continuation of U.S. patent application Ser. No. 11/512,775, filed Aug. 30, 2006, each of which is hereby incorporated by reference in its entirety.

TECHNICAL FIELD

This application relates to a method and system to generate a portable contract document.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A potential buyer who walks onto a car lot may have little control over the amount of time and effort that may be required to complete a sales transaction. A seller, typically, has little incentive to complete a sale of a motor vehicle at a price that is initially suggested by a customer. On the contrary, as negotiations between a seller and a buyer progress, the seller may be able to convince the buyer to pay a higher price for a vehicle than the buyer initially suggested.

A buyer of a vehicle (or of any other high average selling price (ASP) item) typically does not enjoy the benefit of a safe and affordable way of paying for such items. For example, a buyer of a motor vehicle typically does not have an access to a chargeback feature that is provided by some existing on-line payment services.

BRIEF DESCRIPTION OF DRAWINGS

Embodiments of the present invention are illustrated by way of example and not limitation in the figures of the accompanying drawings, in which like reference numbers indicate similar elements and in which:

FIG. 4 is a diagrammatic representation of an example user interface to collect data for generating a contract document, in accordance with an example embodiment;

DETAILED DESCRIPTION

Figure 1:
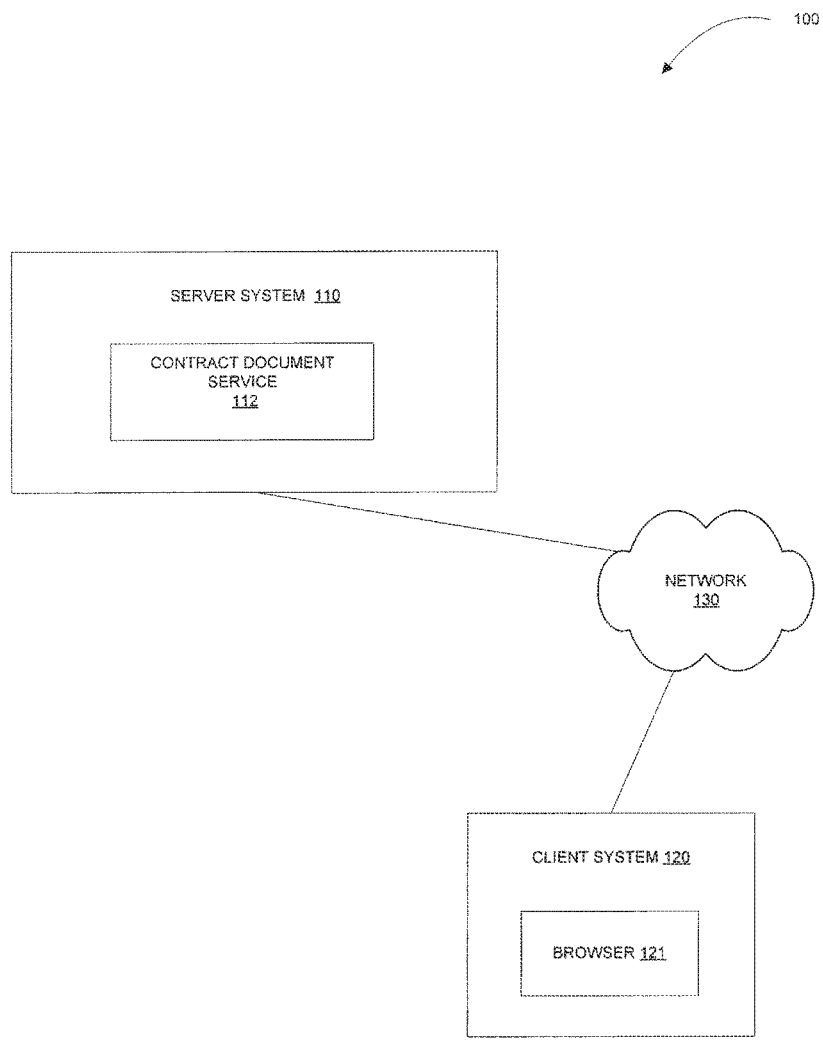
FIG. 1 is a diagrammatic representation of a network environment within which an example embodiment may be implemented.

A system and method are described to generate a contract document for a sale of an item, e.g., in an example embodiment of a contract document service. The term "a sale item" will be understood to include goods, services or a combination thereof. The generated contract document may be utilized for a variety of purposes and thus may be termed a portable contract document. In one example embodiment, such portable contract document may empower the buyers on one hand, while potentially bringing business to sellers on the other hand.

An example method to generate a contract document in response to a buyer's request may be used in a variety of practical situations. In one example involving a motor vehicle, a potential buyer (or merely a buyer) may find a car that she may be interested in purchasing. Typically, a potential buyer may identify a car of interest, e.g., in a classified listing, by noticing a sign in a window, on a car dealer's lot or by talking to a relative or a friend. After a desired vehicle has been identified, the buyer may access a web-based service (e.g., termed a contract document service), provide relevant information associated with the vehicle (e.g., a vehicle identification number (VIN), year, make, model, condition/accessories, etc.) and then be able to print out a newly generated contract document and bring it to the seller (e.g., to a car dealer's lot). Specifically, the newly generated contract document may include a price selected by the buyer as the preferred price, a preferred funding source selected by the buyer, as well as any appropriate terms and conditions.

A contract document service may be configured, in one example embodiment, to pre-qualify a buyer for a loan and to handle the title transfer. Furthermore, where the selected funding sources are, e.g., cash or wire transfer, the transaction may be handled by a financial institution or a financial service provider (e.g., PayPal®). PayPal is a registered trademark of PayPal, an eBay Company. In one example embodiment, the contract document service may be configured to permit the buyer to choose a purchase insurance coverage. In one example embodiment, a predetermined fee (e.g., a flat fee) may be associated with a buyer's choice of a particular financial institution or a financial service provider.

In one example embodiment, the generated contract document may be made available to the buyer by permitting the buyer to print the contract document, to save the contract document at a particular location, to fax the contract document to a seller, or by some other means. Utilizing a method where a buyer is permitted to obtain a customizable portable contract document, and where the buyer is in charge of naming the preferred price for a sale item, may enhance the buyer's experience during the price negotiation or may eliminate the price negotiations step altogether. It will be noted that, while a contract document service may be of a particular use for high ASP items, such as motor vehicles, a contract document may be generated for a sale of any item or service.

In one example embodiment, a buyer or a seller may be charged with a fee in return for the generated contract document. In some example embodiments, the contract document service may be augmented with a feature permitting a buyer to obtain a detailed vehicle history report, a roadside assistance service or some other services.

In one example embodiment, contract documents generated as described above may be utilized as leads. When the generated contract documents are being utilized as leads, such leads may be provided to sellers for a predetermined fee. In another example embodiment, a buyer may be permitted to provide a preferred price or a preferred price range to a brokerage system and to receive in return information regarding sale items (e.g., sale motor vehicles) that match the buyer's preferred price or price range.

Example embodiments of a system to generate a portable contract document may be implemented in the context of a network environment. An example of such a network is illustrated in FIG. 1.

FIG. 1 illustrates a network environment 100. The environment 100, in an example embodiment, includes a server system (server) 110 and a client system (client) 120, coupled to a communications network 130. The communications network 130 may be a public network (e.g., the Internet, a wireless network, etc.) or a private network (e.g., LAN, WAN, Intranet, etc.). In the environment 100, the client 120 may have access to a contract document service 112 running on the server 110 via a browser application 121. An example system to provide the contract document service 112 is discussed with reference to FIG. 2.

Figure 2:
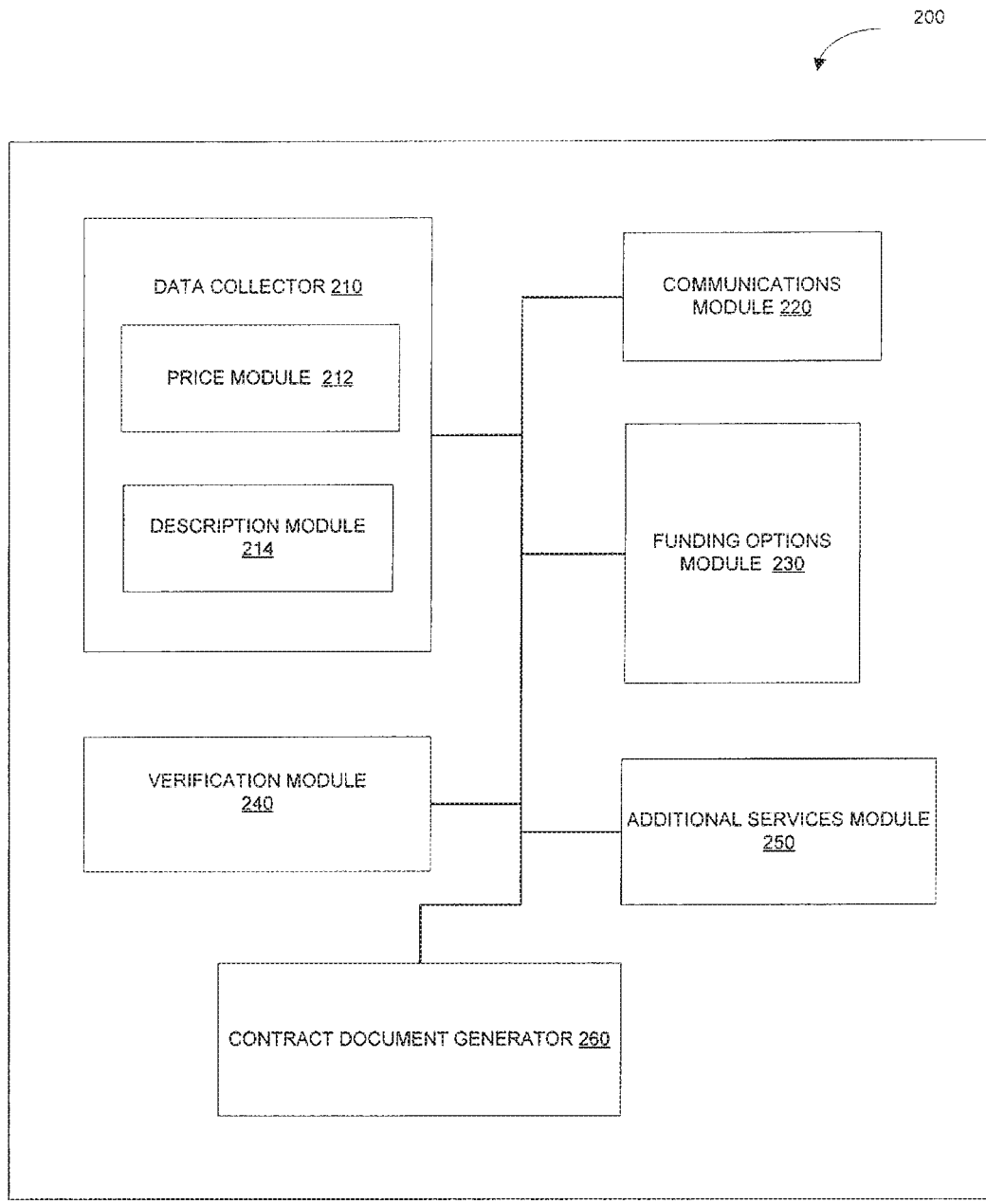
FIG. 2 a block diagram of a system to generate a portable contract document, in accordance with an example embodiment.

FIG. 2 is a block diagram of a system 200 to generate a portable contract document, in accordance with an example embodiment. As shown in FIG. 2, the system 200 includes a data collector 210, a communications module 220, a funding options module 230, a verification module 240, an additional services module 250 and a contract document generator 260. The data collector 210 may be configured to collect information associated with a sale item, and may include a price module 212 and a description module 214. The verification module 240 may be configured to obtain information regarding title information for the sale item, as well as a user's eligibility for specific funding options. The additional services module 250 may be configured to provide, to a user, information regarding availability of additional services associated with the sale item.

It will be noted that, in some example embodiments, the functions performed by two separate modules of the system 200 may be performed by a single module. For example, the verification of the eligibility of a user for a certain funding option may be performed by the funding options module 230. In another example embodiment, the operations performed by the price module 212 and the description module 214 may be performed by a single sale item information module (not shown).

As mentioned above, the contract document service 112, which, in an example embodiment, may be implemented as the system 200, may be utilized to generate a portable contract document for a sale of an item. An example method to generate such a portable contract document is described with reference to FIG. 3.

Figure 3:
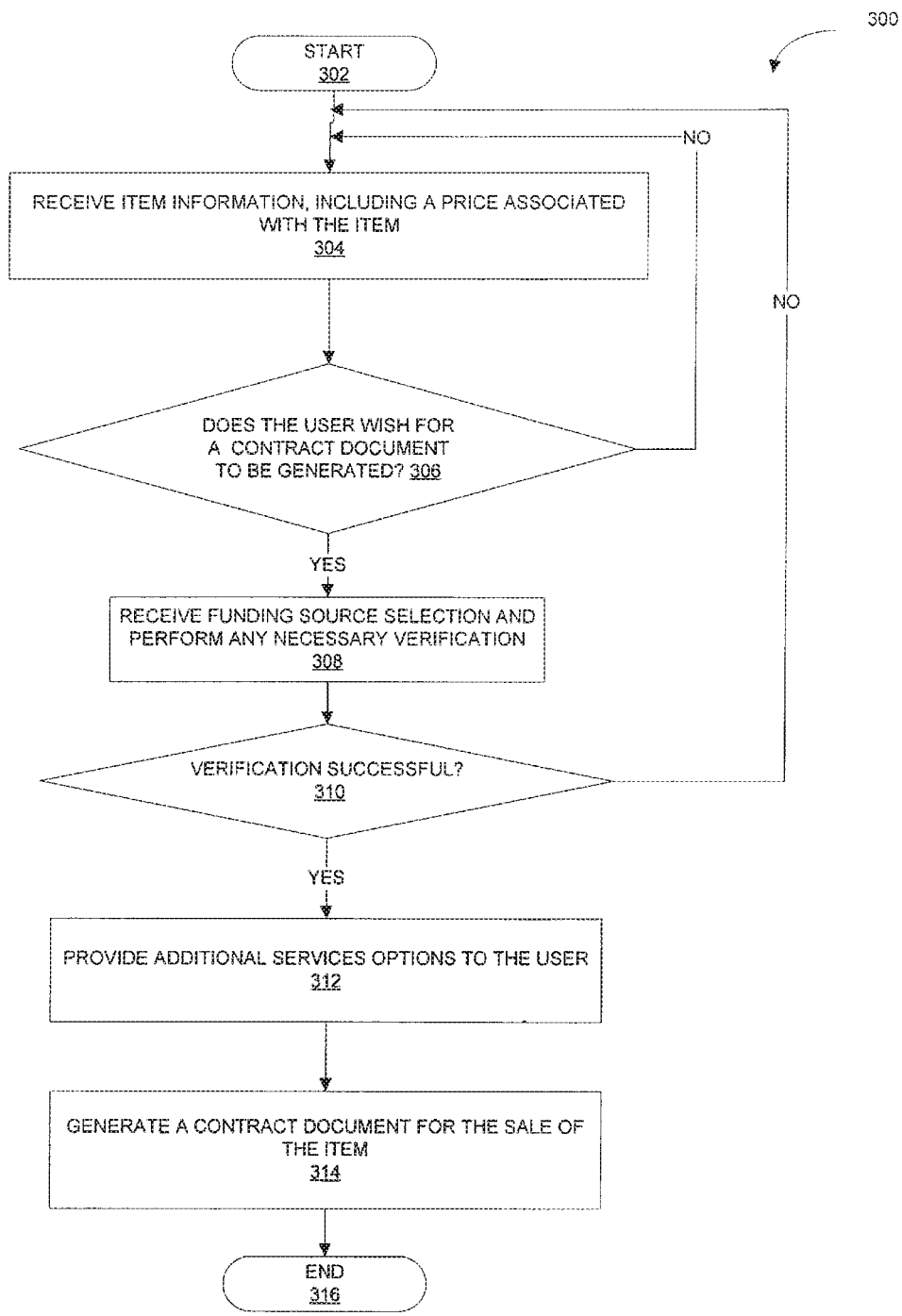
FIG. 3 is a flow chart of a method to generate a portable contract document, in accordance with an example embodiment.

FIG. 3 is a flow chart of a method 300 to generate a portable contract document, according to an example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at a server system 110 of FIG. 1. In another example embodiment, the processing logic may reside at the client 120, at a server 110 or may be distributed between the client 120 and the server 110 of FIG. 1. In one example embodiment, the method 300 may be performed by the various modules discussed above with reference to FIG. 2. Each of these modules may comprise processing logic.

As shown in FIG. 3, the method 300 commences at operation 302. At operation 304, the data collector 210 receives, from a user (e.g., a potential buyer) information associated with a sale item. The sale item may be, for example a motor vehicle, a piece of industrial equipment, an item of jewelry, or some other item or a service. In one example embodiment, the price module 212 receives, from the user, the price information associated with the sale item, while the description module 214 receives the description information associated with the sale item. The price information may be a preferred price that a user is willing to pay for the sale item.

At operation 306, the communications module 220 communicates an inquiry to a user to determine whether the user wishes for a contract document to be generated. If the communications module 320 receives a positive indication from the user, the method 300 proceeds to operation 308.

At operation 308, the funding options module 230 receives, from a user (e.g., via the browser application 121 residing at the client 120 of FIG. 1), a selection of a funding source and the verification module 240 performs any necessary verification, such as the user's eligibility to utilize the selected funding source, the availability of sufficient funds for the user, the user's credit history, etc. The verification module 240 may also perform verification of the title of the sale item, verification with respect to a seller of the item, as well as verification with respect to the user. Verification with respect to the user may include verifying user's identity and user's geographic location, including zip code, city and state. In one example embodiment, the user's identity and/or location may be verified, e.g., with respect to any existing user account information.

It will be noted, that the system to generate a portable contract document may be configured to permit a user to select more than one funding source, such as a personal account and a loan. In one example embodiment, the some verification operation may be performed by the funding options module 230. If it is determined, at operation 310, that the verification is successful, the method 300 proceeds to operation 312.

At operation 312, the additional services module 250 provides to the user information regarding any additional services options associated with the sale item. Such additional services, in one example embodiment, may include providing insurance protection for the sale item and, where the sale item is a motor vehicle, title verification services and road assistance services. In a further example embodiment, the additional services options may be presented to a user (e.g., to a potential buyer) in view of the buyer's profile, seller's profile, or based on the information associated with the sale item.

In response, a user may choose to register for any selected additional services, decline the suggested additional services or defer the decision to register for additional services.

The control is then passed to the contract document generator 260 and a contract document is generated at operation 314. The method terminates at operation 316.

It will be noted that, in one example embodiment, there may be an associated fee with respect to generating a portable contract document. In one example embodiment, such a fee may be capped at a predetermined value. Furthermore, in one example embodiment, the contract document generator 260 may include a designation of a particular electronic payment processing service into the portable contract document. One example electronic payment processing service may be a service, such as PayPal service, that provides chargeback capability to a buyer. Thus, a method to generate a portable contract document may also afford a buyer a benefit of a safe and affordable way of paying for a high ASP sale item.

FIG. 4 is a diagrammatic representation of an example user interface 400 to collect data for generating a contract document, in accordance with an example embodiment. As shown in FIG. 400, the user interface (UI) 400 may be an interactive electronic document, where a user (e.g., a potential buyer) is permitted to enter relevant data into the provided data fields. The name of a sale item, that may be accompanied by a brief description, may be entered into field 402. A control 404 (e.g., radio button, a checkbox, or some other control) may be checked if the subject sale item is a motor vehicle. It will be noted, however, that the subject sale item may be any other item (e.g., furniture, appliances, sports equipment, etc) or a service (e.g., house remodel, auto repair, etc.).

The UI 400 may further provide field 406 for entering a make of the sale item (e.g., the make of a car, if the subject sale item is a motor vehicle). A user may also be permitted to enter year information into field 408 and price information into field 412. Any additional relevant information associated with the sale item may be entered into field 410. In one example embodiment, a potential buyer, who is filling out the information associated with the user interface 400, may specify such price in the price field 412 that is acceptable to the potential buyer.

Fields 414 and 416 may be used to receive the seller's information and the buyer's information respectively. It will be noted that, in one example embodiment, the seller information may be not specific to a particular seller. For example, a user may be permitted to leave the seller information field 414 blank. Alternatively, a user may be permitted to include in the seller information field 414 generic information, such as a geographic location information of a potential seller (e.g., city or state), or a type of a potential seller (e.g., a dealership or an individual).

Further included in the UI 400 are additional services fields. Field 418 may be used to indicate that the user would be interested in obtaining insurance protection for the sale item. The details of such insurance protection may be included in field 420. Where the sale item is a motor vehicle, the user may select a road assistance option by utilizing field 422 and providing any additional details regarding a desired road assistance options in field 424.

In one example embodiment, the UI 400 may include a verification information area 426. Within the verification information area 426, a user may request funding verification by marking a funding verification control 428, designate a financial service or institution in field 430, request seller verification by marking a seller verification control 432 and request title verification for a motor vehicle by marking a title verification control 434.

Upon filling the fields of the UI 400, a user may proceed to the next step by engaging a "NEXT" control 436. A user may also exit the UI 400 without saving any of the entered information by engaging a "CANCEL" control 438. Information collected via the UI 400 may be further utilized for a variety of purposes, as described with reference to FIG. 5.

Figure 5:
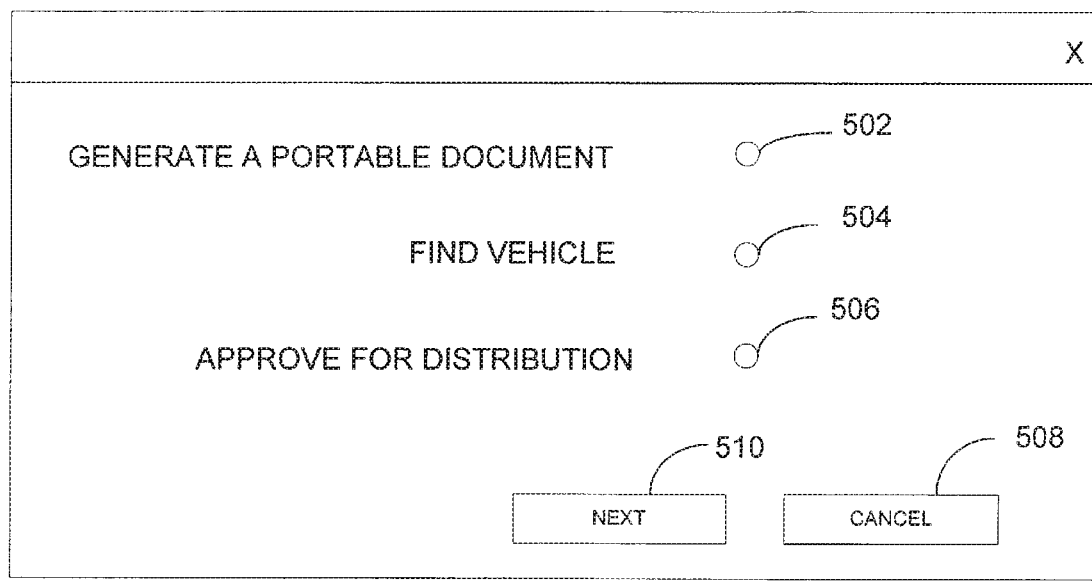
FIG. 5 is a diagrammatic representation of an example user interface to collect data indicating a potential use of information collected from a user or a contract document, in accordance with an example embodiment.

FIG. 5 is a diagrammatic representation of an example user interface 500 to collect data indicating a potential use of information collected from a user or of a generated contract document. The user interface 500, in accordance with an example embodiment, comprises a selection control "GENERATE A PORTABLE DOCUMENT" 502, a selection control "FIND VEHICLE" 504 and a selection control "APPROVE FOR DISTRIBUTION" 506. The selection controls 502, 504 and 506 may be, for example, radio buttons, checkboxes or some other types of controls.

A user may click on the selection control "GENERATE A PORTABLE DOCUMENT" 502 to indicate that the user wishes the system 200 of FIG. 2 to generate a contract document, utilizing the information provided by the user. As mentioned above, a portable document, not specific to a particular seller, may be generated by the system 200. A user may indicate, via the selection control "FIND VEHICLE" 504, that the information collected by UI 400 may be utilized to identify any motor vehicles that may be acceptable to the user, based on the collected information. A user may indicate, via the selection control "APPROVE FOR DISTRIBUTION" 505, that the information collected by UI 400 may be utilized for distribution to sellers.

In one example embodiment, the user interface 500 includes a "CANCEL" control 508 that can be used to exit the user interface 500 without saving any of the entered information and a "FINISH" control 510 that may be used to complete the process of generating a contract document. In order to represent and manipulate information associated with a contract document, the system 200 of FIG. 2 may utilize various example data structures, as discussed with reference to FIG. 6 and FIG. 7 below.

Figure 6:
FIG. 6 is a diagrammatic representation of an example data structure to represent sale item information, in accordance with an example embodiment.

FIG. 6 is a diagrammatic representation of an example data structure 600 to represent sale item information, in accordance with an example embodiment. As shown in FIG. 6, the data structure 600 comprises fields 602 through 610. "ITEM.TITLE" field 602 is used to represent the title of a sale item. "ITEM.AUTO" field 604 is used to indicate that a sale item is a motor vehicle. "ITEM.MAKE" field 606 is used to represent the make of a sale item. "ITEM.YEAR" field 608 is used to represent the year of manufacturing of a sale item. "ITEM.DESCRIPTION" field 610 is used to represent the description of a sale item.

Figure 7:
FIG. 7 is a diagrammatic representation of an example data structure to represent verification information, in accordance with an example embodiment.

FIG. 7 is a diagrammatic representation of an example data structure 700 to represent verification information, in accordance with an example embodiment. As shown in FIG. 7, the data structure 700 comprises fields 702 through 706. "VERIFICATION.FUNDING" field 702 is used to represent verification information associated with the funding sources selected by the user (e.g., a potential buyer). "VERIFICATION.SELLER" field 704 is used to represent verification information associated with a seller the sale item. "ITEM.TITLE" field 706 is used to represent verification information associated with the title of a sale item.

It will be noted, that sale item information, verification information, as well as other information utilized by the system 200 of FIG. 2, may be represented utilizing a variety of techniques that may be available to a person skilled in the art.

Figure 8:
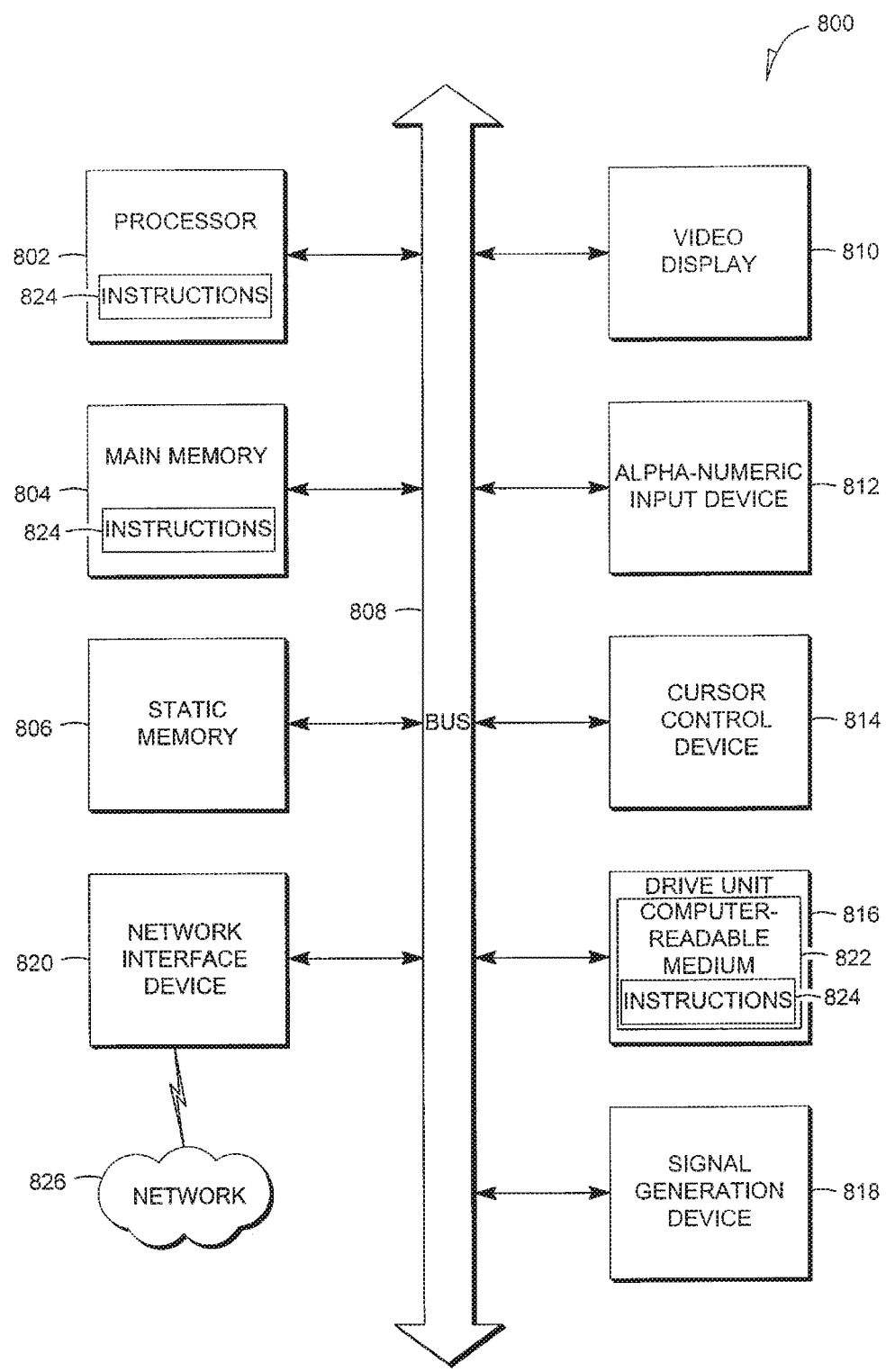
FIG. 8 is a diagrammatic representation of an example machine in the form of a computer system within which a set of instructions, for causing the machine to perform any one or more of the methodologies discussed herein, may be executed.

FIG. 8 shows a diagrammatic representation of a machine in the example form of a computer system 800 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as a "Moving Picture Experts (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alpha-numeric input device 812 (e.g., a keyboard), a user interface (UI) navigation device 814 (e.g., a cursor control device), a disk drive unit 816, a signal generation device 818 (e.g., a speaker) and a network interface device 820.

The disk drive unit 816 includes a machine-readable medium 822 on which is stored one or more sets of instructions and data structures (e.g., software 824) embodying or utilized by any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820 utilizing any one of a number of well-known transfer protocols (e.g., Hyper Text Transfer Protocol (HTTP)).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of embodiments of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMS), read only memory (ROMs), and the like.

The embodiments described herein may be implemented in an operating environment comprising software installed on a computer, in hardware, or in a combination of software and hardware.

Thus, a method and system to generate a portable contract document have been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
   generating, at a web-based service, a user interface comprising an interactive electronic document displaying, on at least one screen, a visual control for collecting contract information, the contract information comprising at least one of sale item information, buyer information, or sale price information;
   receiving at the web-based service from a client device associated with a buyer and via the interactive electronic document, the contract information that includes at least one of the sale item information, the buyer information, and the sale price information;
   generating a contract document for a sale of the sale item based on the contract information; and
   communicating the contract document to the client device associated with the buyer via a network communication.

2. The method of claim 1, wherein interactive electronic document displays, on the at least one screen, a first visual control for collecting the sale item information, a second visual control for collecting the buyer information, and a third visual control for collecting the sale price information, wherein the web-based service causes presentation of the interactive electronic document at the client device associated with the buyer.

3. The method of claim 1, comprising causing presentation of the interactive electronic document at the client device associated with the buyer.

4. The method of claim 1, wherein the web-based service that generates the user interface for collecting contract information is provided by an entity distinct from a seller of the sale item.

5. The method of claim 1, wherein the interactive electronic document displays a verification control actionable to perform verification of identity of a potential buyer represented by the buyer information.

6. The method of claim 5, wherein the verification of identity of the potential buyer is performed utilizing existing user account information associated with the potential buyer.

7. The method of claim 5, wherein the generating of the contract document is in response to a positive verification of the identity of the potential buyer.

8. The method of claim 1, wherein the sale item is a motor vehicle.

9. The method of claim 1, wherein the interactive electronic document displays an insurance protection control operable to indicate that a potential buyer represented by the buyer information is interested in obtaining insurance protection for the sale item.

10. A system comprising:
   one or more processors; and
   a non-transitory computer readable storage medium comprising instructions that when executed by the one or processors cause the one or more processors to perform operations comprising:
   generating, at a web-based service, a user interface comprising an interactive electronic document displaying, on at least one screen, a visual control for collecting contract information, the contract information comprising at least one of sale item information, buyer information, or sale price information;

receiving at the web-based service from a client device associated with a buyer and via the interactive electronic document, the contract information that includes at least one of the sale item information, the buyer information, and the sale price information;

generating a contract document for a sale of the sale item based on the contract information; and communicating the contract document to the client device associated with the buyer via a network communication.

11. The system of claim 10, wherein interactive electronic document displays, on the at least one screen, a first visual control for collecting the sale item information, a second visual control for collecting the buyer information, and a third visual control for collecting the sale price information, wherein the web-based service causes presentation of the interactive electronic document at the client device associated with the buyer.

12. The system of claim 10, comprising causing presentation of the interactive electronic document at the client device associated with the buyer.

13. The system of claim 10, wherein the web-based service that generates the user interface for collecting contract information is provided by an entity distinct from a seller of the sale item.

14. The system of claim 10, wherein the interactive electronic document displays a verification control actionable to perform verification of identity of a potential buyer represented by the buyer information.

15. The system of claim 14, wherein the verification of identity of the potential buyer is performed utilizing an existing user account information associated with the potential buyer.

16. The system of claim 14, wherein the generating of the contract documents in response to a positive verification of the identity of the potential buyer.

17. The system of claim 10, wherein the sale item s a motor vehicle.

18. A machine-readable non-transitory storage medium having instruction data executable by a machine to cause the machine to perform operations comprising:

generating, at a web-based service, a user interface comprising an interactive electronic document displaying, on at least one screen, a visual control for collecting contract information, the contract information comprising at least one of sale item information, buyer information, or sale price information;

receiving at the web-based service from a client device associated with a buyer and via the interactive electronic document, the contract information that includes at least one of the sale item information, the buyer information, and the sale price information;

generating a contract document for a sale of the sale item based on the contract information; and communicating the contract document to the client device associated with the buyer via a network communication.

* * * * *